United States Patent
Johnson

(10) Patent No.: US 8,427,954 B2
(45) Date of Patent: Apr. 23, 2013

(54) AUTOMATIC REVERSE CHANNEL ASSIGNMENT IN A TWO-WAY TDM COMMUNICATION SYSTEM

(75) Inventor: Kevin P. Johnson, Palm Bay, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 13/333,081

(22) Filed: Dec. 21, 2011

(65) Prior Publication Data
US 2012/0087353 A1    Apr. 12, 2012

Related U.S. Application Data

(63) Continuation of application No. 12/493,506, filed on Jun. 29, 2009, now Pat. No. 8,085,665, which is a continuation of application No. 10/894,223, filed on Jul. 19, 2004, now Pat. No. 7,554,916, which is a continuation of application No. 09/574,622, filed on May 19, 2000, now Pat. No. 6,804,252.

(51) Int. Cl.
*H04L 12/26* (2006.01)
*H04W 4/00* (2009.01)
*H04J 3/00* (2006.01)

(52) U.S. Cl.
USPC ........... 370/235; 370/321; 370/329; 370/336; 370/458; 455/450

(58) Field of Classification Search .......... 370/235–512; 455/33.1, 450, 51.1, 56.1, 58.1, 58.2; 709/223–249
See application file for complete search history.

(56) References Cited

U.S. PATENT DOCUMENTS

| | | | |
|---|---|---|---|
| 4,675,863 | A | 6/1987 | Paneth et al. |
| 4,817,089 | A | 3/1989 | Paneth et al. |
| 4,862,453 | A | 8/1989 | West et al. |
| 4,866,709 | A | 9/1989 | West et al. |
| 5,027,348 | A | 6/1991 | Curry, Jr. |

(Continued)

FOREIGN PATENT DOCUMENTS

| | | |
|---|---|---|
| EP | 0 758 822 | 2/1997 |
| WO | 96/15599 | 5/1996 |

(Continued)

OTHER PUBLICATIONS

Engels et al., "Radio Access to an ATM Network with a TDD/TDMA-OFDM System," Vehicular Technology Conference, vol. 3, pp. 1654-1658 (May 4-7, 1997).

(Continued)

*Primary Examiner* — Afsar M. Qureshi
(74) *Attorney, Agent, or Firm* — Volpe and Koenig, P.C.

(57) ABSTRACT

A method and apparatus for communication is disclosed. Information is received on a downlink channel in a time interval. On a condition that an explicit allocation of a first uplink channel is received, feedback information regarding the received information is transmitted on the first uplink channel, wherein the feedback information is transmitted with user data on the first uplink channel. On a condition that an explicit allocation of the first uplink channel is not received, feedback information regarding the received information is transmitted in a time interval on a second uplink channel, wherein an explicit allocation of the second uplink channel is not received, wherein the time interval on the second uplink channel is a pre-determined time period away from the time interval on the downlink channel.

6 Claims, 4 Drawing Sheets

U.S. PATENT DOCUMENTS

| | | | |
|---|---|---|---|
| 5,687,194 | A | 11/1997 | Paneth et al. |
| 5,740,168 | A * | 4/1998 | Nakamura et al. ............ 370/347 |
| 5,781,540 | A * | 7/1998 | Malcolm et al. ............. 370/321 |
| 5,852,604 | A | 12/1998 | Cooley et al. |
| 5,930,297 | A | 7/1999 | Kaewell, Jr. et al. |
| 5,974,039 | A | 10/1999 | Schilling |
| 6,075,792 | A | 6/2000 | Ozluturk |
| 6,240,073 | B1 | 5/2001 | Reichman et al. |
| 6,804,252 | B1 | 10/2004 | Johnson |
| 7,554,916 | B2 | 6/2009 | Johnson |
| 2002/0099854 | A1 * | 7/2002 | Jorgensen ..................... 709/249 |

FOREIGN PATENT DOCUMENTS

| | | |
|---|---|---|
| WO | 98/44639 | 10/1998 |
| WO | 99/44341 | 9/1999 |
| WO | 99/63682 | 12/1999 |

OTHER PUBLICATIONS

Hanratty et al., "Performance Analysis of Hybrid ARQ Protocols in a Slotted Direct-Sequence Code Division Multiple-Access Network: Jamming Analysis," IEEE Military Communications Conference, Vol. 2, pp. 383-387 (Oct. 15-18, 1989).

Third Generation Partnership Project, "Technical Specification Group Radio Access Network; Physical channels and mapping of transport channels onto physical channels (FDD) (Release 1999)", 3G TS 25.211 V3.2.0 (Mar. 2000).

Third Generation Partnership Project, "Technical Specification Group Radio Access Network; Spreading and modulation (FDD) (Release 1999)", 3G TS 25.213 V3.2.0 (Mar. 2000).

Third Generation Partnership Project, "Technical Specification Group Radio Access Network; Physical layer procedures (FDD) (Release 1999)", 3G TS 25.214 V3.2.0 (Mar. 2000).

Third Generation Partnership Project, "Technical Specification Group Radio Access Network; Physical channels and mapping of transport channels onto physical channels (FDD) (3G TS 25.211 version 3.0.0)," 3G TS 25.211 V3.0.0 (Oct. 1999).

Third Generation Partnership Project, "Technical Specification Group Radio Access Network; Radio Interface Protocol Architecture (Release 1999)," 3G TS 25.301 V3.4.0 (Mar. 2000).

* cited by examiner

AUTOMATIC REVERSE CHANNEL ASSIGNMENT IN A TWO-WAY TDM COMMUNICATION SYSTEM

CROSS REFERENCE TO RELATED APPLICATIONS

This application is a continuation of U.S. patent application Ser. No. 12/493,506 filed Jun. 29, 2009, which issued as U.S. Pat. No. 8,085,665 on Dec. 27, 2011, which is a continuation of U.S. patent application Ser. No. 10/894,223 filed Jul. 19, 2004, which issued as U.S. Pat. No. 7,554,916 on Jun. 30, 2009, which is a continuation of U.S. patent application Ser. No. 09/574,622 filed May 19, 2000, which issued as U.S. Pat. No. 6,804,252 on Oct. 12, 2004, which are incorporated by reference as if fully set forth.

FIELD OF INVENTION

This application is related to wireless communications.

BACKGROUND

Continued growth in the electronics and computer industries, and indeed in the economy in general, is increasingly driven by the demand for access to the Internet and the myriad of services and features that it provides. The proliferation in the use of portable computing equipment, such as laptop computers, hand-held Personal Digital Assistants (PDAs) and Internet-enabled cellular telephones have resulted in a corresponding increase in demand for wireless access to computer networks. However, at the present time, existing wireless networks, such as the cellular telephone network, are not optimum for data communications. This is at least in part due to the architecture of such networks as originally designed. In particular, these networks were intended to support voice communications, as compared to the digital communication protocols needed for Internet packet-oriented communications. For example, voice grade services typically require access to a communication channel bandwidth of approximately 3 kilohertz (kHz). While techniques do exist for communicating data over such radio channels at a rate of 9.6 kilobits per second (kbps), such low bandwidth channels do not lend themselves directly to efficient transmission of data at the typical rates of 56.6 kbps or higher that are now commonly expected using wireless modems.

In addition, the very nature of Internet traffic itself is different from the nature of voice traffic. Voice communication requires a continuous duplex connection, that is, a user at one end of a connection expects to be able to transmit and receive to a user at the other end of a connection, while at the same the user at the other end is also transmitting and receiving.

However, the usage patterns of Internet data transmission systems are quite different from voice. For example, consider that access to Web pages over the Internet in general is burst-oriented. Typically, the user of a remote client computer first specifies the address of a Web page to a browser program. The browser program at the client computer then sends the request as a Transmission Control Protocol (TCP)/Internet Protocol (IP) message packet, which is typically about 100 bytes in length, to a network Web server. The Web server then responds with the content of the requested Web page, which may include anywhere from approximately 10 kilobytes to several megabytes of text, image, audio or video data. The user may thereafter spend several seconds or even several minutes reading the contents of the page before specifying a next Web page to be downloaded.

The result is that a typical Internet connection remains idle for a relatively long period of time. However, once a request is made, the user expects the information to be transmitted to the client at a relatively rapid rate. Therefore, making available channels only on an instantaneous "as needed" basis makes sense and indeed is a requirement if wireless data transfer services are to efficiently co-exist with the existing wireless voice communication systems. Therefore, dynamic traffic channel allocation schemes are required to increase the efficiency of high performance wireless data communication systems in an effort to more efficiently utilize available channel resources.

Furthermore, in most wireless systems, there are typically many more potential users or subscribers than available radio channel resources. Therefore, some type of demand-based multiple access technique is therefore typically required to make maximum use of the available radio channels. Multiple access is often provided in the physical layer, such as by Frequency Division Multiple Access (FDMA) or by schemes that manipulate the radio frequency signal such as Time Division Multiple Access (TDMA) or Code Division Multiple Access (CDMA). In any event, the nature of the radio spectrum is such that it is a medium that is expected to be shared. This is quite dissimilar to the traditional environment for data transmission, in which a wired medium such as a telephone line or network cabling is relatively inexpensive to obtain and to keep open all the time.

SUMMARY

A particular problem exists with efficiently adapting communication systems which use on-demand multiple access techniques in the physical layer to efficiently handle the TCP/IP message traffic which is prevalent in Internet communications. Consider that the TCP/IP protocol is a frame-based protocol requiring the acknowledgment of the receipt of message frames. Thus, for example, when a user requests that a Web page be transmitted, the initial message requesting the Web page is sent on a reverse link communication channel from a client computer towards a Web server computer. The sending of the request message also requires allocation of a forward link connection to allow the acknowledgment message to return from the server to the client.

Unfortunately, in a wireless communication environment in which demand access is granted to wireless radio channels, opening up a new reverse link channel for the acknowledgment message is a time consuming process. For example, to allocate a channel in the reverse link direction may indeed end up taking longer than the time necessary to simply transmit the very short acknowledgment message.

The present invention seeks to overcome these difficulties. The invention is used in a time division multiplex (TDM) communication system supporting duplex operations whereby multiple users share forward and reverse channels. The system makes use of time slots to allocate specific channels on a demand basis. Thus, for example, a given forward link channel is allocated for only a predetermined time slot duration and only upon user request.

To minimize overhead in the allocation of channels, forward and reverse link time slots are automatically assigned in pairs. In particular, rather than requiring a separate process for allocating reverse link channels for the sending of acknowledgment messages in response to receipt of a forward link packet, a different scenario takes place. At the receiving end, such as for valid reception of data on a forward link channel at a central base station site, a reverse link time slot is automatically allocated in a time slot which depends upon the time slot allocation on the forward link.

This scheme assists with the rapid return of acknowledgment messages in a reverse link direction which is the predominant direction for such messages in a wireless system wherein most data traffic is Web page oriented.

The invention has several other advantages. Among these include the avoidance of the need to set up and tear down channels, especially reverse link channels, for the limited purpose of sending acknowledgment messages.

Minimizing the amount of reverse link traffic on shared frequency channels, such as in a CDMA system, in turn increases the data handling capacity of the entire system. The reverse link messages may also include other types of anticipated short messages, depending upon the type of forward link messages sent. For example, these may include link layer acknowledgment messages, or higher layer GET messages for links embedded in a Web page.

While the invention provides particular advantages in not explicitly allocating reverse link traffic channels for the anticipation of acknowledgment and other short messages, dedicated reverse link channels may still be explicitly allocated for long message traffic.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
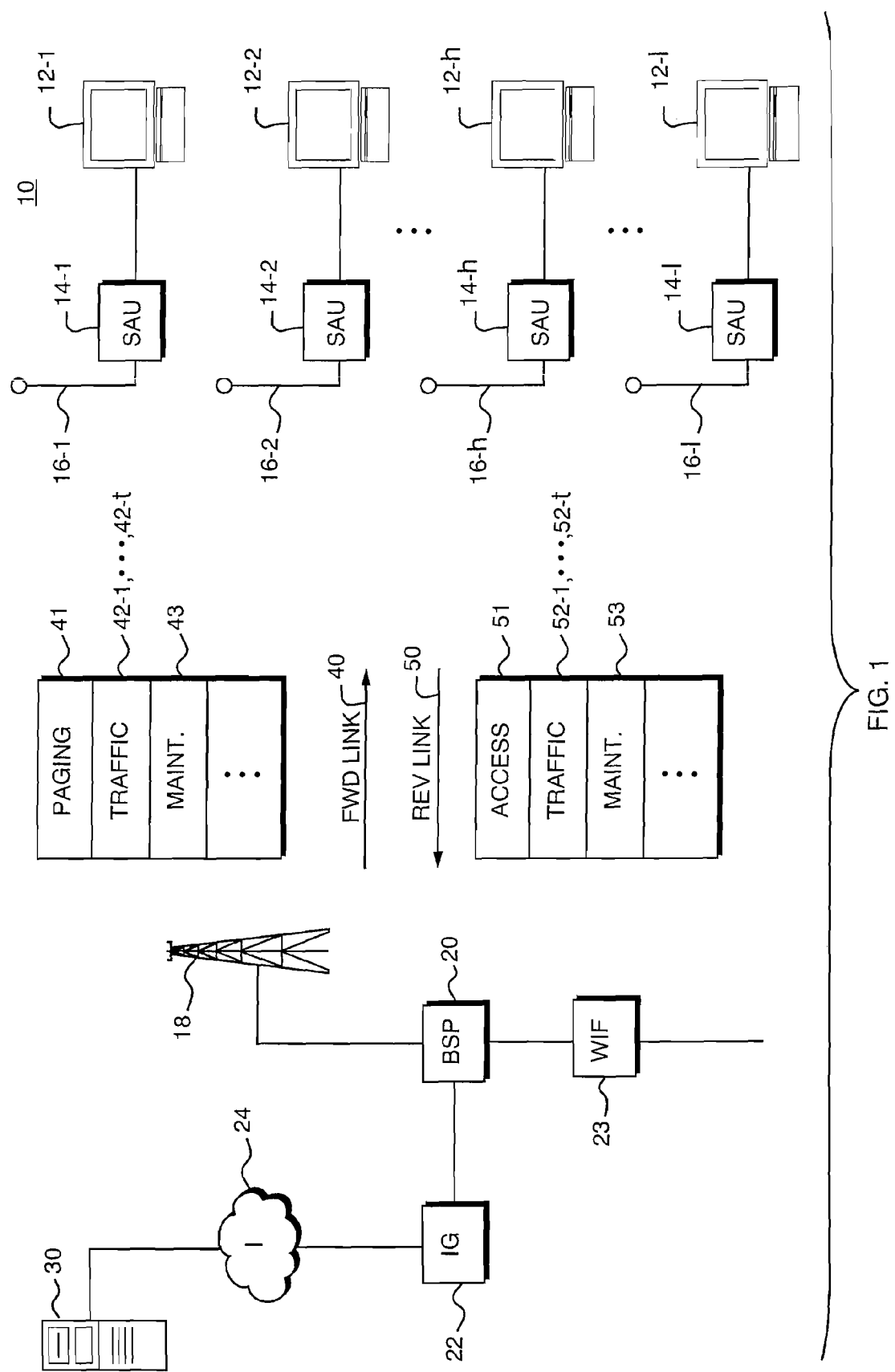
FIG. 1 is a block diagram of a communication system in which reverse channel assignment occurs automatically in response to valid reception of data on a forward link channel.

FIG. 1 is a block diagram of a communication system 10 that is suitable for automatic assignment of a reverse link channel such as to carry acknowledgment messages in response to a receipt of a valid message on a forward link channel. In particular, the communication system 10 shown includes a number of personal computer (PC) devices 12-1, 12-2, ... 12-h, ... 12-l, and corresponding Subscriber Access Units (SAUs) 14-1, 14-2, ... 14-h, ... 14-l, and associated antennas 16-1, 16-2, ... 16-h, ... 16-l. Centrally located equipment includes a base station antenna 18, a base station processor (BSP) 20, Internet gateway 22, Internet 24, and network file server 30. The system is a demand access, point to multi-point wireless communication system such that the PCs 12 may transmit data to and receive data from network server 30 through wireless connections implemented over forward links 40 and reverse links 50. It should be understood that in a point to multi-point multiple access wireless communication system 10 as shown, a given base station processor 20 typically supports communication with a number of different subscriber access units 14 in a manner which is similar to that used in a cellular telephone communication network.

The PCs 12 may, for example, be laptop computers 12-l, handheld 12-h, or Personal Digital Assistant (PDA)-type computers. The computers 12 are each connected to a respective SAU 14 through a suitable wired connection such as an Ethernet-type connection. The respective SAU 14 permits the PC 12 to be connected to the network file server 30 through several types of physical connections.

In the reverse link direction, that is, for data traffic traveling from the PC 12 towards the server 30, the PC 12 provides an Internet Protocol (IP) level packet to the SAU 14 over the wired connection. The SAU 14 then appends to the wired framing (i.e., Ethernet framing) in the IP packet and inserts appropriate wireless connection framing. The appropriately formatted wireless data packet then travels over one or more radio channels provided by the reverse link 50 through the antennas 16 and 18. At the central base station, the BSP 20 extracts the radio link framing, reformatting the packet in IP form and routes it through the Internet gateway 22. The packet is then forwarded through any number and/or type of TCP/IP networks, such as the Internet 24, to its ultimate destination, such as the network file server 30.

By way of example, the wireless packet framing information may be that described in Patent Cooperation Treaty Application No. WO99/44341 entitled "Dynamic Frame Size Setting For Multichannel Transmission," published Sep. 2, 1999, and which is hereby incorporated by reference. In that scheme, Code Division Multiple Access (CDMA) encoding is used to define multiple logical channels on a given physical channel. For example, a long pseudo-random noise (PN) code sequence can be used to define multiple logical channels on a given radio frequency carrier signal. Other codes may be layered on the long PN code, such as error correction codes or optional short pseudo-random noise (PN) codes, to further define the channels and make them robust in noisy environments.

Data may also be transmitted in the opposite direction, that is, from the network file server 30 to the PCs 12, in a forward direction. In this instance, an Internet Protocol (IP) packet originating at the file server 30 travels through the Internet 24 through the Internet gateway 22 arriving at the BSP 20. Appropriate wireless protocol framing is then added to the IP packet. The packet then travels through the antenna 18 and 16 to the intended receiver SAU 14. The receiving SAU 14 then processes the message according to the wireless packet formatting, ultimately forwards the packet to the intended PC 12 which performs the IP layer processing. A given SAU 14 and the file server 30 are thus viewed as the end points of a given duplex connection at the IP level. Once a connection is established, a user at the PC 12 may therefore transmit data to and receive data from the file server 30.

In accordance with the link layer or even a higher layer TCP/IP protocol, a receiving endpoint is expected to send an acknowledgment message to the corresponding sending unit upon complete and correct receipt of a packet. This acknowledgment message may be sent in response in a cumulative fashion, such that a given acknowledgment message indicates that a number of consecutive packets have been received successfully. However, in any event, it can be appreciated that these acknowledgment messages in the system 10 must be sent over the forward link 40 or reverse link 50 in response to messages sent on the reverse 50 or forward 40 link, respectively. Given that the system 10 is a wireless system, radio resources must therefore be provisioned for sending such acknowledgment messages regardless of the exact physical layer configuration.

As will be described in greater detail later, the reverse link 50 actually consists of a number of different types of logical and/or physical radio channels including an access channel 51, multiple traffic channels 52-1, ... 52-t, and a maintenance channel 53. The reverse link access channel 51 is used by the SAUs 14 to send messages to request that traffic channels be granted to them. The assigned traffic channels 52 then carry payload data from the SAU 14 to the BSP 20. It should be understood that a given IP level connection may actually have more than one traffic channel 52 assigned to it as described in the previously referenced patent application. In addition, a maintenance channel 53 may carry information such as synchronization and power control messages to further support transmission of information over the reverse link 50.

Similarly, the forward link 40 typically includes a logical paging channel 41 that is used by the BSP 20 to not only inform the SAU 14 that forward link traffic channels 52 have been allocated to it, but also to inform the SAU 14 of allocated traffic channels 52 in the reverse link direction. Traffic channels 42-1 ... 42-t on the forward link 40 are used to carry payload information from the BSP 20 to the SAUs 14. Additionally, maintenance channels carry synchronization and power control information on the forward link 40 from the base station processor 20 to the SAUs 14.

Additional information as to one possible way to implement the various logical channels 41, 42, 43, 51, 52, and 53 is also provided in Patent Cooperation Treaty Application No. WO99/63682 entitled "Fast Acquisition Of Traffic Channels For A Highly Variable Data Rate," published Dec. 9, 1999.

Figure 2:
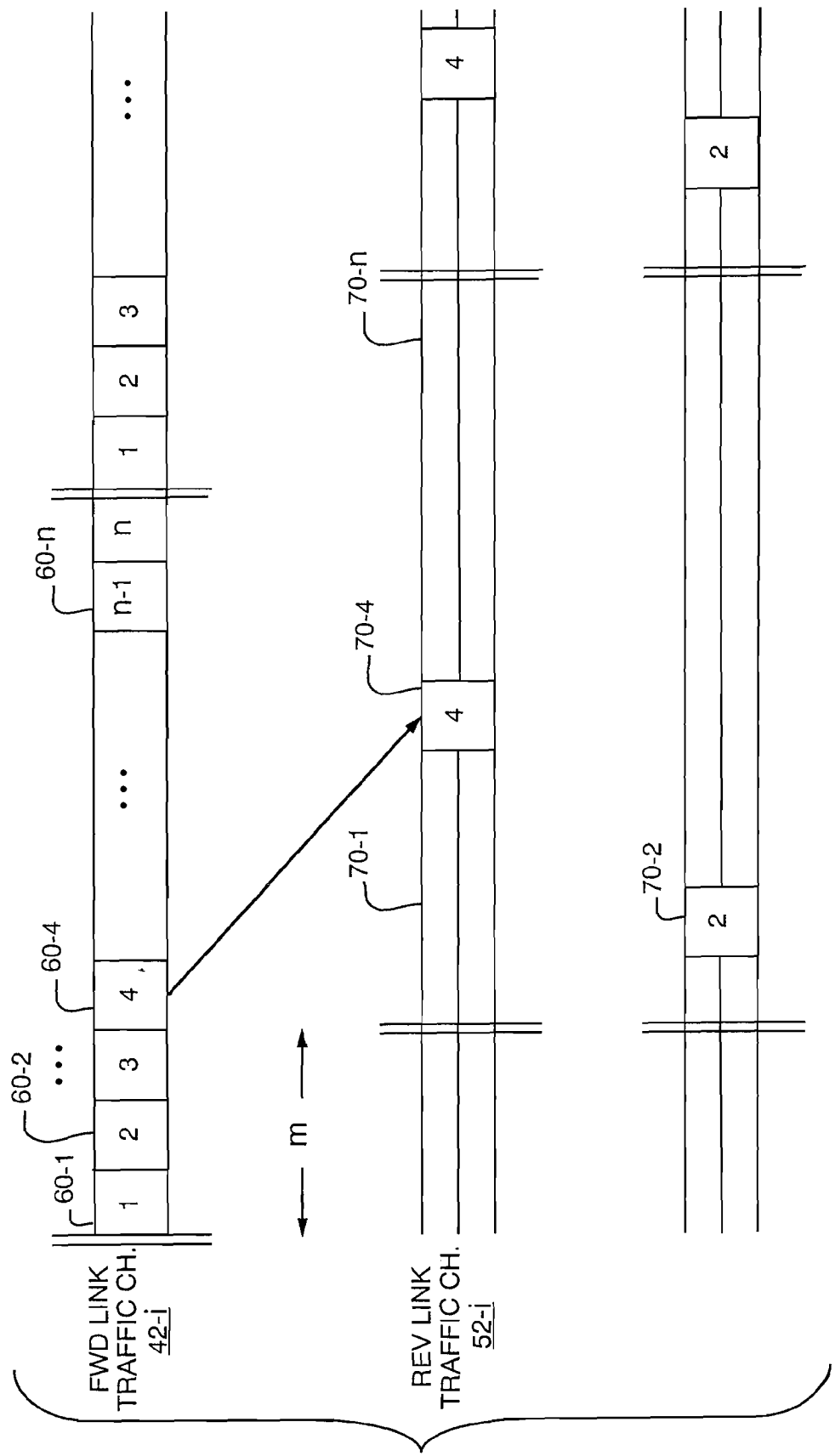
FIG. 2 is a diagram depicting channel slot assignments.

As shown more particularly in FIG. 2, a typical forward link traffic channel 42 is partitioned into a pre-determined number of periodically repeating time slots 60-1, 60-2, ... 60-n for transmission of messages to the multiple SAUs 14. A given SAU 14 identifies messages directed to itself based upon when a message is received in an assigned time slot 60. It should be understood that a given SAU 14 may at any instant in time have multiple ones of the time slots 60 assigned to it or at other times may have no time slots assigned to it. The assignment of time slots 60 is communicated from a central controller such as a wireless Internet facility base station controller 23 or the BSP 20 itself over the paging channel 41. The allocation of radio and traffic channels occurs on a demand basis among the various SAUs 14 in a physical area serviced by the system 10.

The manner of assignment of the time slots and radio channels is not of importance to the present invention; rather the present invention is more concerned with the manner in which a time slot 60 is automatically assigned in the reverse link 50 upon reception of a valid message on the forward link 40.

In particular, the reverse link traffic channels 52 are shared among the multiple SAUs 14. For example, a given reverse link traffic channel 52-i is partitioned into a number of time slots 70-1 ... 70-n in a manner similar to the way in which the forward link traffic channel 42-i is partitioned.

Consider that a given forward link traffic channel 42-i may include a particular time slot 60-4. This time slot 60-4 carries packet data from the base station processor 20 to an intended SAU 14-2. However, unlike prior art systems, there is no specific assignment needed of reverse link traffic channel slots by sending paging channel messages to inform the connection associated with the particular time slot 60-4. Rather, upon receiving the data packet in time slot 60-4, the SAU 14 determines whether the data has been properly received such as by performing error check processing. If the packet is indicated as having been received properly, the SAU 14 makes an assumption that the acknowledgment message will be expected to be transmitted in corresponding time slot 70-4 on the reverse link traffic channel 52-i.

The time slot 70-4 is positioned timewise a given number of time slots, m, away from the time slot 60-4 allocated to the forward link. This, in effect, results in automatic reservation of a reverse link time slot for the acknowledgment message a fixed number of time slots, m, in the future.

Similarly, an acknowledgment message for a packet sent in time slot 60-2 is acknowledged in the time slot 70-2. The time slot 70-2 remains the m time slots away from its associated forward link time slot 60-2.

Several advantages result from this arrangement. In particular, no control signaling is required on the paging channel 41 to allocate reverse link time slots for the acknowledgment messages. The technique efficiently uses the reverse channel for acknowledgment messages such as TCP/IP layer ARQ messages among a large number of SAUs 14. The short time delay duration for these acknowledgment messages in turn increases the effective utilization of the traffic channels 52 on the reverse link, as well as the paging channel 41 on the forward link 40.

It should be understood that the time slot 70-4 can also carry other short messages, such as link layer acknowledgment messages. In many applications, link layer acknowledgments must be handled rapidly, and the invention provides this capability.

At higher protocol levels, the reverse time slot can be used for sending embedded links in a Web page. For example, a typical Hypertext Transfer Protocol (HTTP) Web page file has several embedded links which are requests to fetch other files. These embedded links can be sent back on the reverse channel using the time slots 70-4.

Figure 3:
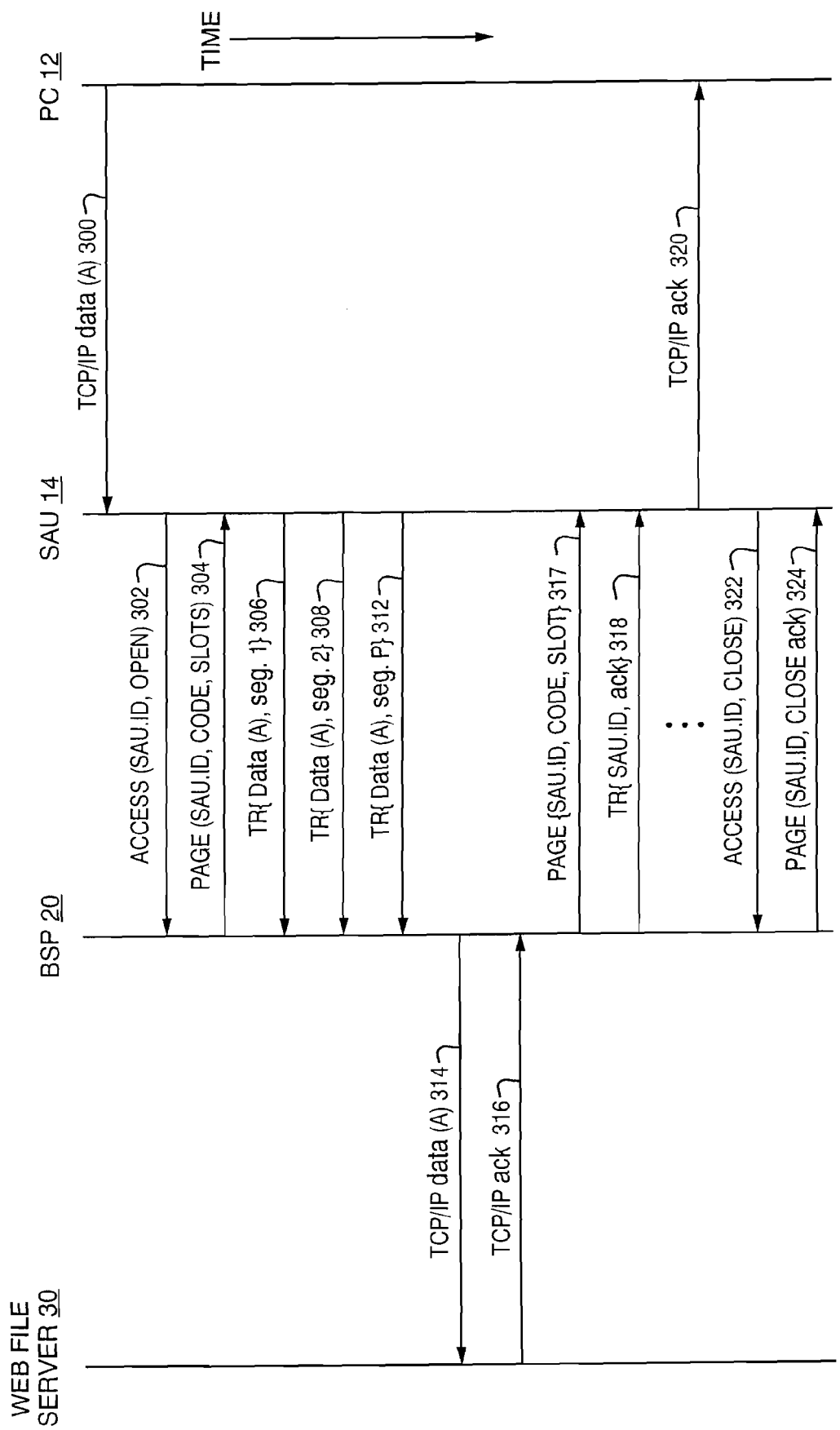
FIG. 3 is a message sequence chart illustrating a typical message sent on the reverse link and the resulting acknowledgment sent on the forward link.

FIG. 3 depicts a message sequence chart illustrating the transmission of a TCP/IP packet and acknowledgment message exchange traveling in the reverse direction, that is from the PC 12 towards the server 30, with the server 30 sending the acknowledgment message back to the PC 12. The protocol diagram indicates message flow from right to left through the PC 12, SAU 14, BSP 20 and Web file server 30. The protocol diagram depicted in FIG. 3 is typical for the transmission of messages in a worldwide Web type environment.

This exchange of messages is typical of prior art systems in that a channel is explicitly allocated for acknowledgment in the message transmission. For example, the user of the PC 12 may be specifying a Web page address for which it is desired to be downloaded from the file server 30 to the PC 12. The message thus typically consists of a higher level protocol (Hypertext Transfer Protocol (HTTP), File Transfer Protocol (FTP), or the like) page request or "GET" message which is layered on the TCP/IP protocol. In any event, a first message consists of a TCP/IP layer message that contains a data packet indicated in the diagram as packet (A).

Next, the SAU 14 receives this TCP/IP layer data message 301 and reformats it for transmission over the wireless reverse link 50. In particular, the receipt of the TCP/IP message (A) results in a number of messages being sent on the access channel 51, paging channel 41, and traffic channels 52.

First, a message 302 is sent on the access channel 51 requesting the allocation of traffic channels 52 from the BSP 20. This message 302 typically consists of identification information that identifies the particular SAU 14 requesting the traffic channels, and a command, such as OPEN, that indicates to the BSP 20 that the associated SAU 14 is requesting that a logical traffic channel be opened.

In response thereto, the BSP 20 sends a channel allocation message on the forward link paging channel 41. This channel allocation message 304 indicates an SAU identification (ID), and a pseudo-random noise code assigned for the traffic channel and to permit the SAU 14 to decode its respective logical channel, and information indicating one or more of time slots to which this connection is being allocated.

In response to receipt of message 304, the payload portion of the packet (A) is then partitioned by the SAU 14 among the available allocated time slots. Thus, it may actually be necessary to transmit the packet (A) in multiple segments indicated as SEG 1, SEG 2, . . . SEG p in multiple traffic messages 306, 308, . . . , 312 sent on the traffic channels 52. It should be understood that depending on system loading requirements and capacity, a given connection may be allocated a single time slot on a single reverse link traffic channel 52, or it may be the situation where multiple traffic channels and/or time slots may be allocated to transmission of the various segments of packet (A).

In any event, the BSP 20 receives the messages 306, 308, . . . , 312 containing the various segments SEG 1, SEG 2, . . . SEG p and reassembles them into the complete TCP/IP data packet (A). The assembled packet (A) is then reformulated as a TCP/IP message 314 and forwarded to the Web file server 30.

If Web file server 30 receives packet (A) correctly, it then provides an acknowledgment message 316 intended for the PC 12 that originated the message. To send this acknowledgment message thus requires the allocation of a radio channel to forward it to the respective SAU 14. This channel allocation process involves first sending a message 317 on the forward paging channel 41 indicating to the respective SAU to allocate a code channel and time slot for the acknowledgment message.

A message 318 is then sent on the indicated traffic channel with the appropriate code and assigned time slot for the acknowledgment 318. Upon receipt of message 318 at the SAU 14, the acknowledgment message is reformulated as a TCP/IP level frame in message 320 and forwarded to the PC 12. Further messages are then needed to de-allocate the forward link traffic channel 40 allocated for the acknowledgment message by, for example, sending a message 322 on the access channel requesting that the traffic channel be closed, and acknowledgment of the closing of the message being returned on the paging channel by message 324.

Figure 4:
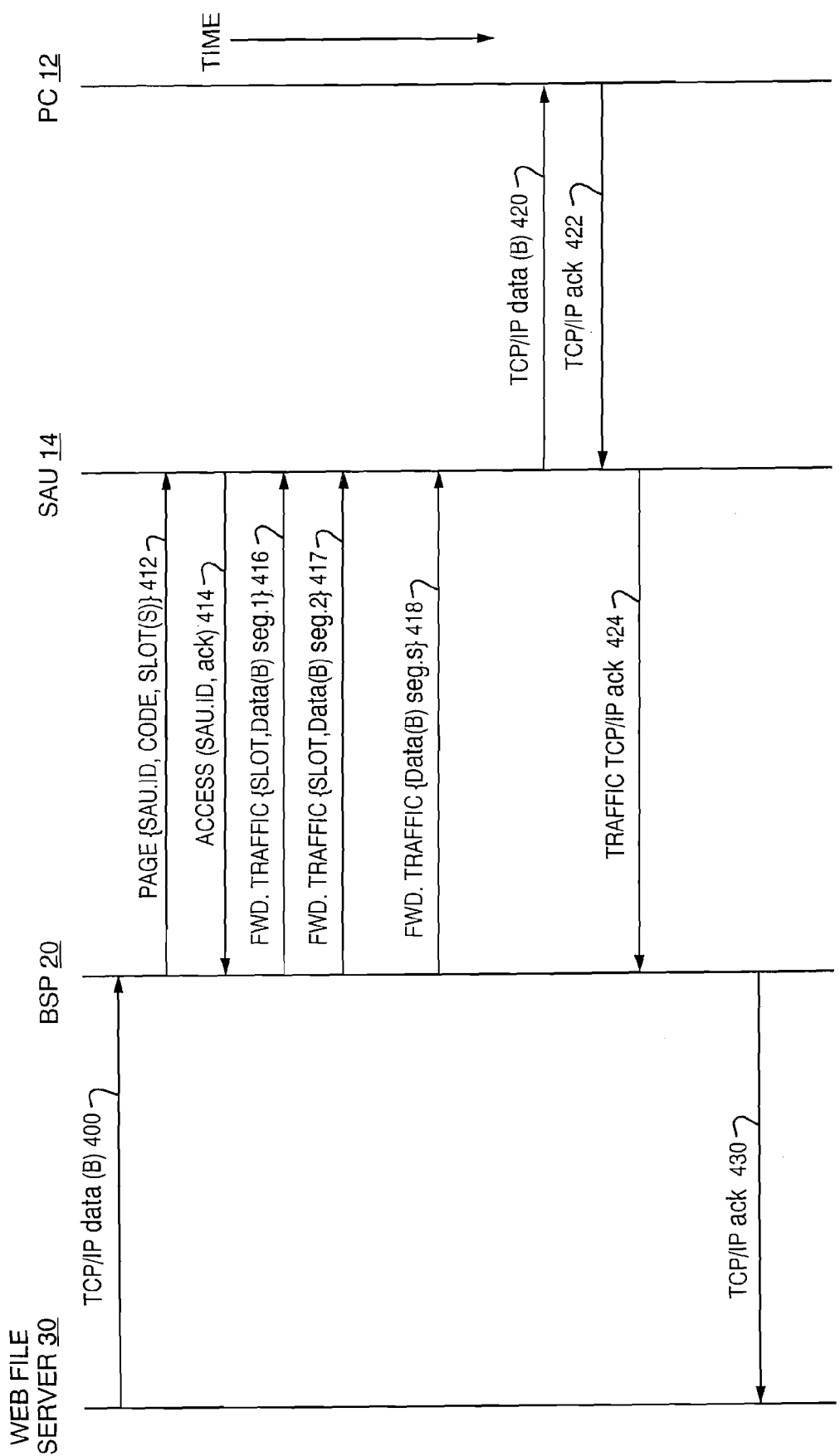
FIG. 4 is a message sequence chart illustrating a typical forward link message and resulting acknowledgment message to sequence on the reverse link.

Turning attention now to FIG. 4, it can be understood how messages are exchanged for acknowledgment on the forward link 40 without the need to explicitly allocate channels for acknowledgment messages on the reverse link 50. FIG. 4 depicts the message sequence for a packet (B) traveling in a forward link 40 direction from the Web server 30 towards the PC 12. It will be understood in this situation that these packets typically include Web page data being transmitted down to the PC 12 from the Web file server 30, and thus are typically transmitted far more often than messages traveling in the reverse link 50 direction. Thus, these forward link messages, being far more common and prevalent, benefit greatly from a more efficient acknowledgment scheme.

In any event, the data packet (B) originates as a TCP/IP level message 400 at the Web server 30 and is then forwarded to the BSP 20. Upon receipt of this message 400, the BSP 20 then causes a number of messages 412, 414, 416 and 418 to be exchanged between the BSP 20 and SAU 14. In particular, a paging channel message 412 is sent on the forward link 40 indicating an SAU ID, PN code, and one or more time slots being assigned between the BSP 20 and the particular SAU 14. This message is then acknowledged, for the wireless physical layer connection, by a return message 414 being sent from the SAU 14 back to the BSP 20. This indicates to the BSP 20 that the SAU 14 is ready to receive data.

The BSP 20 then proceeds to send the various segments SEG. 1, SEG. 2, . . . SEG. s as a series of messages 416, 417, 418 sent on one or more of the forward traffic channels 42 at indicated slots and with indicated codes. Upon completion of these messages, SAU 14 has received all of the segments making up the packet (B). These segments may then be reformulated as a TCP/IP layer data packet (B) in a message 420 which is forwarded to the PC 12.

The PC 12 then returns an acknowledgment message 422 to the SAU 14. This in turn causes a single message 424 to be sent on a traffic channel on the reverse link 50. The time slot for this message is determined from the time slots allocated on the forward link to the same connection. (This has been described previously in connection with FIG. 2.) The acknowledgment message is received at the BSP 20 and then reformulated as a TCP/IP layer acknowledgment packet 430 and forwarded to the Web server 30.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:
   circuitry configured to receive information on a downlink channel in a time interval;
   on a condition that an explicit allocation of a first uplink channel is received, circuitry configured to transmit feedback information regarding the received information on the first uplink channel, wherein the feedback information is transmitted with user data on the first uplink channel; and
   on a condition that an explicit allocation of the first uplink channel is not received, circuitry configured to transmit feedback information regarding the received information in a time interval on a second uplink channel, wherein an explicit allocation of the second uplink channel is not received, wherein the time interval on the second uplink channel is a pre-determined time period away from the time interval on the downlink channel.

2. The apparatus of claim 1 wherein the information is received in multiple segments.

3. The apparatus of claim 1 wherein the feedback information is an acknowledgement message.

4. A method for communication comprising:
   receiving information on a downlink channel in a time interval;
   on a condition that an explicit allocation of a first uplink channel is received, transmitting feedback information regarding the received information on the first uplink channel, wherein the feedback information is transmitted with user data on the first uplink channel; and
   on a condition that an explicit allocation of the first uplink channel is not received, transmitting feedback information regarding the received information in a time interval on a second uplink channel, wherein an explicit allocation of the second uplink channel is not received, wherein the time interval on the second uplink channel is a pre-determined time period away from the time interval on the downlink channel.

5. The method of claim 4 wherein the information is received in multiple segments.

6. The method of claim 4 wherein the feedback information is an acknowledgement message.

* * * * *